US008376120B2

(12) United States Patent
Brown

(10) Patent No.: US 8,376,120 B2
(45) Date of Patent: Feb. 19, 2013

(54) PAPER HANDLING APPARATUS

(75) Inventor: John Brown, London (GB)

(73) Assignee: Neopost Technologies, Bagneux (FR)

( * ) Notice: Subject to any disclaimer, the term of this patent is extended or adjusted under 35 U.S.C. 154(b) by 277 days.

(21) Appl. No.: 12/847,393

(22) Filed: Jul. 30, 2010

(65) Prior Publication Data

US 2011/0024263 A1 Feb. 3, 2011

(30) Foreign Application Priority Data

Jul. 31, 2009 (GB) .................................. 0913301.8

(51) Int. Cl.
*B65G 47/26* (2006.01)

(52) U.S. Cl. .................. 198/418.7; 198/418.8; 271/3.17

(58) Field of Classification Search ............... 198/418.5, 198/418.6, 418.7, 418.8, 419.3; 271/3.15, 271/3.17, 10.03, 4.03, 4.09, 10.1
See application file for complete search history.

(56) References Cited

U.S. PATENT DOCUMENTS 3,636,828 A * 1/1972 Achelpohl ................. 198/418.8
6,915,184 B2 * 7/2005 Yates et al. .................... 700/224
7,912,384 B2 * 3/2011 Dan ................................ 399/16
2003/0083778 A1 * 5/2003 Masotta ........................ 700/219
2004/0172158 A1 * 9/2004 Hart et al. ..................... 700/223
2007/0235287 A1 * 10/2007 Rice et al. .................. 198/419.3

FOREIGN PATENT DOCUMENTS

GB 2389574 A 12/2003

* cited by examiner

*Primary Examiner* — Gene Crawford
*Assistant Examiner* — Keith R Campbell
(74) *Attorney, Agent, or Firm* — Sughrue Mion, PLLC

(57) ABSTRACT

A paper handling apparatus including: feeder stations for feeding documents to a conveyer; a collator for collating documents into packs, and collating packs into groups of documents; an inserter module for inserting each group into an envelope; a monitor which monitors the cycling and working times of sections of the inserter module; sensors for determining at least one of: a first desired gap being the minimum gap between trailing edges of consecutive groups, a second desired gap being the minimum gap between the trailing edge of one pack and the leading edge of the following pack a third desired gap being the minimum gap between the trailing edge of one group to the leading edge of the following group; and a controller for controlling the feeder stations to achieve at least one of the desired gaps.

4 Claims, 3 Drawing Sheets

PAPER HANDLING APPARATUS

The present invention relates to a paper handling apparatus which is used to assemble documents and to insert the documents into envelopes for mailing, and a method for operating the apparatus.

A plurality of documents of different sizes and shapes may typically be assembled for insertion into any one envelope. For example it may be required to assemble a letter together with an information brochure and a small advertising leaflet. Each of these constit parts is known as a pack and they must be transported from different storage hoppers and collated into a single pile known as a group in order to be inserted into an envelope.

Consecutive envelopes may need to be loaded with different combinations and different numbers of packs. For example some mailings may require an information brochure and some not. A pack may comprise a single sheet or multiple sheets if more than one feeder feeds onto the pack, or if a single feeder feeds multiple sheets.

In known paper handling apparatus the packs are released from storage hoppers onto a conveyer belt at spaced intervals in a serial manner and they travel along the conveyer to a collating station where they are assembled into respective groups. Thus the first pack of a group enters an empty collating station which remains open so that a second pack of the same group falls on top of the first pack, and likewise if a third pack is required for the same group. Once the group is complete it is inserted into an envelope which is then ejected to an output hopper and a second group of packs of documents is collated.

To maximise productivity output it is desirable to operate the apparatus at the fastest possible speed and to minimise the spacing between adjacent documents. However this can cause paper jams and thus stoppages unless it is ensured that the insertion head can cope with the frequency of arrival of the packs of documents. Therefore it is desirable to optimise the separation of the packs.

According to one aspect of the present invention there is provided a paper handling apparatus comprising: a plurality of feeder stations, for feeding documents to a conveyer, means for collating documents into packs, and means for collating packs into groups of documents, and an inserter module for inserting each group into an envelope, further comprising: means for monitoring the cycling and working times of sections of the inserter module, and means for determining at least one of: a first desired gap being the minimum gap between trailing edges of consecutive groups; a second desired gap being the minimum gap between the trailing edge of one pack and the leading edge of the following pack; a third desired gap being the minimum gap between the trailing edge of one group to the leading edge of the following group; and means for controlling at least one of the feeder stations to achieve at least one of the respective desired gaps.

According to a second aspect of the present invention there is provided a method for operating a paper handling apparatus comprising: a plurality of feeder stations, for feeding documents to a conveyer; means for collating documents into packs; means for collating packs into groups of documents; and an inserter module for inserting each group into an envelope, wherein the method comprises: means for monitoring the cycling and working times of sections of the inserter module; and determining at least one of: a first desired gap being the minimum gap between trailing edges of consecutive groups; a second desired gap being the minimum gap between the trailing edge of one pack and the leading edge of the following pack; a third desired gap being the minimum gap between the trailing edge of one group to the leading edge of the following group; and controlling at least one of the feeder stations to achieve at least one of the respective desired gaps.

For a better understanding of the present invention and to show how the same may be carried into effect, reference will now be made, by way of example, to the accompanying drawings, in which.

Figure 1:
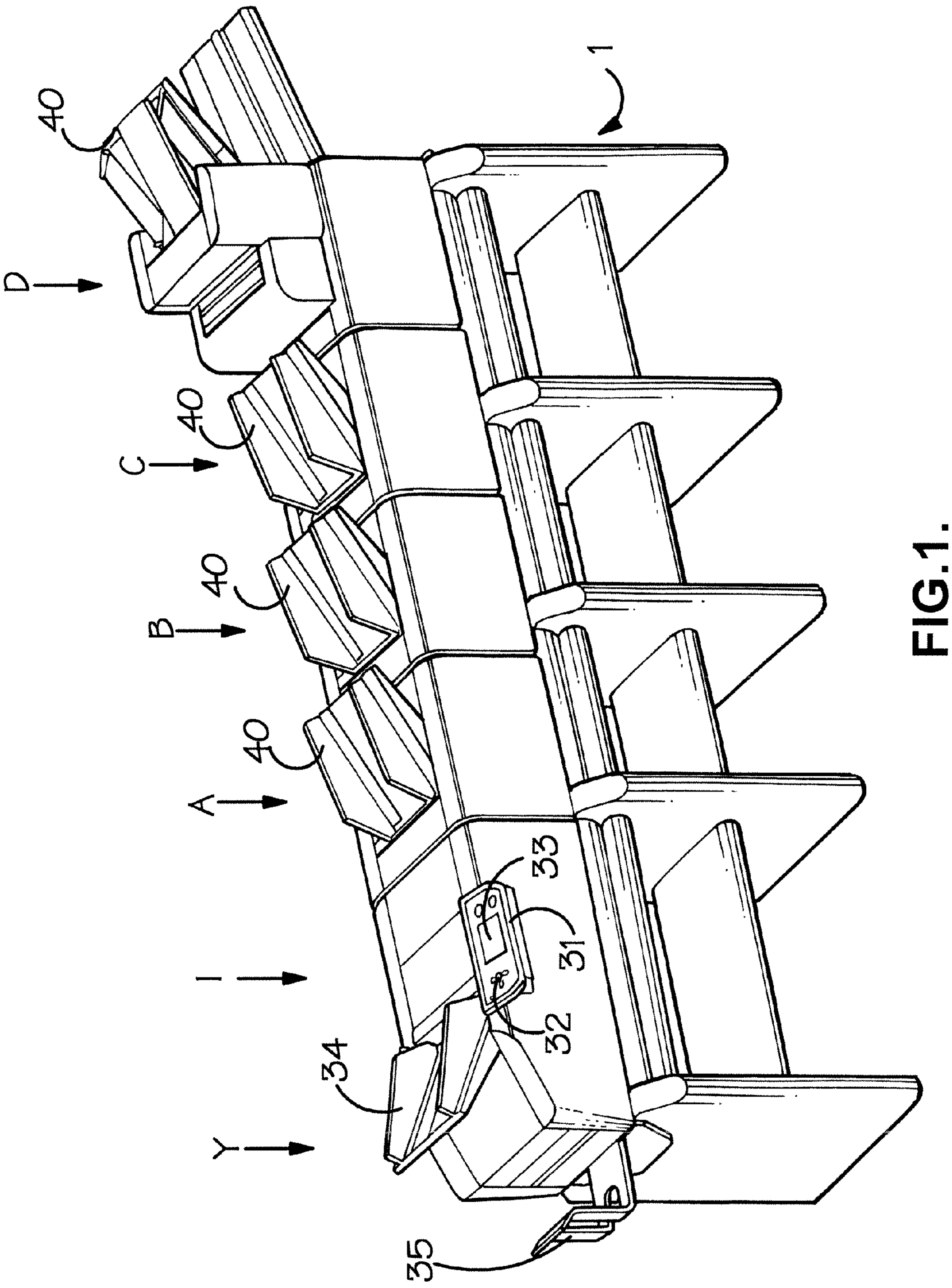
FIG. 1 is a perspective view of a paper handling apparatus according to the present invention.

The paper handling apparatus 1 comprises a collation and inserter station I into which all the documents are ultimately fed from any one or any combination of feeder stations A, B, C and D.

Each feeder station A, B, C, D comprises a document holding hopper 40. A series of conveyors and sensors links the feeder stations and are described in more detail with reference to FIG. 2.

A control panel 31 is positioned towards the collation station I and comprises an array of keys 32 and a display 33 for use by a machine operator to enter operating parameters such as the choice of prime document feeder station, whether inserts are selected manually and from which stations. The operator can alternatively choose that the selection is made automatically, for example by reading a bar code or other markings on the prime document. The control panel 31 may alternatively comprise a PC with a monitor and keyboard, for example mounted above the collator I.

In the example shown in FIG. 1, station D is chosen as the prime document feeder station. This comprises at least one holding hopper 40, a prime document collator for when the prime document consists of more than one sheet of paper, and a folder to reduce the footprint of the prime document to fit into the chosen envelope size. An optical reader may also be incorporated to read coding on the prime document for control and statistical purposes.

Figure 2:
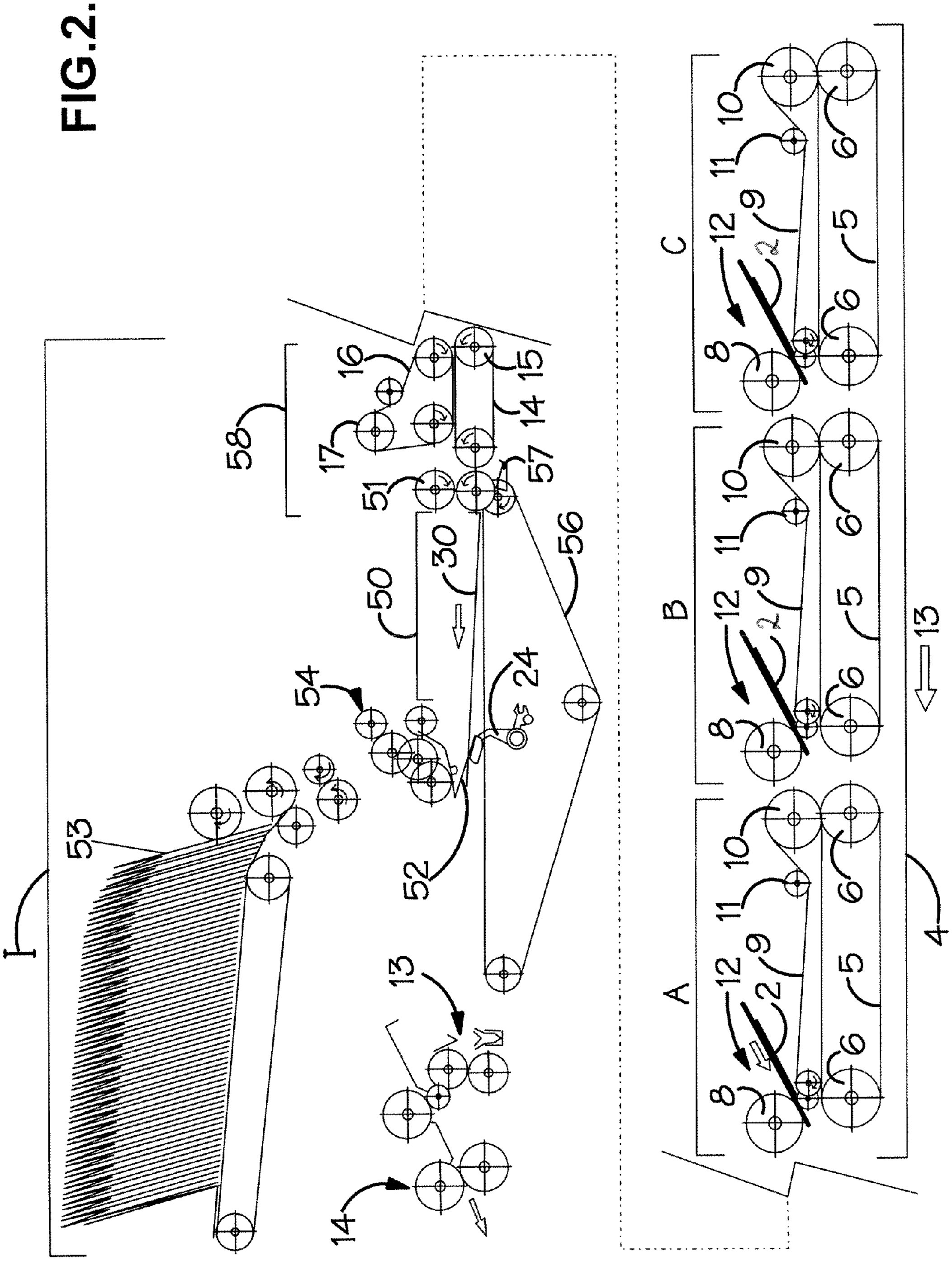
FIG. 2 is a schematic representation of the paper handling apparatus of FIG. 1.

As shown in detail in FIG. 2 each feeder station A, B, C comprises, downstream of the respective document holding hopper 40 shown in FIG. 1, an exit hold point platform 2. A sensor (not shown) may be located on or adjacent the platform 2. A conveyor system 4 links the feeder stations and comprises a series of adjacently located conveyor tracks bridging the gaps between each of the feeder stations A, B, C and D and the collation station I. The tracks each comprise a lower conveyor belt 5 which passes over rollers 6 and an upper conveyor belt 9 which passes over rollers 10. The belts 5, 9 are continuously running. Many arrangements for driving and tensioning the belts will be evident to skilled persons.

A track control sensor (not shown) may be located adjacent each pair of conveyor belts 5, 9 in the vicinity of the subsequent feeder station. Rollers 8 control the exit of a document from respective feeder platforms 2 and are selectively driven by a control means. A control idler roller 11 is movable to control the tension in the upper conveyor belt 9. In practice this may be mounted on a pivoted arm.

Arrows 12 show the direction of feed of documents from the hoppers 40 in FIG. 1 to the platform 2 of each feeder station and arrow 13 shows the direction of movement of documents along the conveyor system. Between feeder station A and collation station I is a further double conveyor belt system comprising lower conveyor belt 14 driven by rollers 15 and upper conveyor belt 16 driven by rollers 17.

A collator in-feed sensor (not shown) may be located at the exit of this double conveyor 14/16.

Independently engageable clutches, or other means for varying the speed of rollers and thus of conveyor belts can be utilized and will be evident to a person skilled in the art.

The collation and insertion station I has an input section 58 and a collate pocket 50 having input rollers 51. An insert drive pawl 57 which is mounted to an insert pawl track chain 56 pushes collated documents out of the collate pocket 50 at appropriate intervals and into an envelope 52 located at the exit to the collate pocket 50. Envelopes are stored in envelope hopper 53 and are fed one at a time into the envelope holding section 54 where the envelope flap is held between the rollers and the envelope mouth is held open by fingers 24 for insertion of the collated group of documents.

Different documents may be put into the hoppers of each of the feeding stations A, B C and D and are fed one at a time, or in packs of several documents of the same type, to the respective feed platforms 2. In feeding the document to the feed platform, any intelligent information can be read by scanners, the lengths of documents can be measured and the position of both the leading edge and trailing edge registered to the reference position of the feed platform.

When all of the relevant documents to form a group to be inserted into an envelope have reached the collation station I, they rest on collation platform 30. The group of documents is typically also decelerated by switching roller speeds as the final portion of the group is released by the input rollers 51 slowly.

The insert drive pawl 57 then pushes the completed collated group into the envelope while a second group of documents is being formed. In this manner the cycle repeats and further groups are continuously created.

The flap of the envelope is then wetted in a wetter 13 and moved to an output module 14 where the flap is sealed and the envelope prepared for mailing.

The present invention provides active feedback control from later stages of the system to control the separation of documents fed on to the conveyors 4 and 10 to optimise the speed and efficiency of the system.

The inventor has identified three important criteria in the system and the invention monitors the cycling times of sections of the apparatus and particularly of the post collation sections such as the wetter, the output, the envelope hopper and the insert pawl track. This is then used to control the timing of parts of the apparatus to ensure that the apparatus can run continuously without unscheduled stoppages due to packs being too close together.

Figure 3:
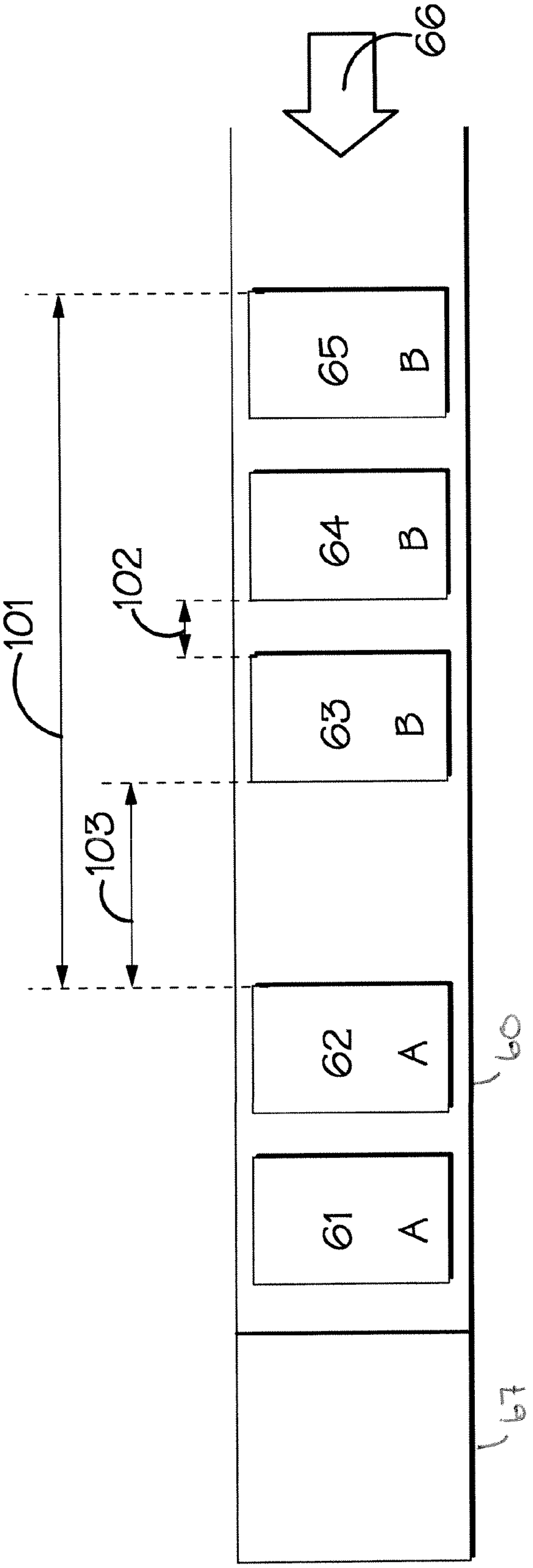
FIG. 3 is a diagram illustrating details of the invention.

These three important criteria are illustrated in FIG. 3 which schematically shows a conveyor track 60 feeding packs of documents 61 to 65 in the direction of arrow 66 toward head unit 67 which in this example is the collating station I of FIGS. 1 and 2. The packs 61 to 65 are travelling serially but packs 61 and 62 are to be collated into one group denoted by the letter A and inserted into one envelope. Packs 63 to 65 are to be collated into a second group denoted by the letter B and inserted into another envelope.

The important criteria are:

101. The minimum gap between the trailing edge of the last pack 62 in one group A to the trailing edge of the last pack 65 in the following group B, i.e. the minimum gap between the last pack in a group and the last pack in the following group.

102. The minimum gap between the trailing edge of one pack 63 to the leading edge of the following pack 64 within the same group B, i.e. the gap between 2 packs within the same group.

103. The minimum gap between the trailing edge of one group A to the leading edge of the following group B, i.e. the gap between the last pack 62 of one group A and the first pack 63 of the following group B, i.e. the gap between the last pack in a group and the first pack of the next group.

Gap 101 is controlled in dependence upon the slowest cycle time of the wetter 13, the output 14, the envelope hopper 53 and the insert pawl track 56.

Gap 102 is controlled to match the time it takes for the collate pocket 50 to receive a pack of documents and to become available to receive a further pack of documents of the same group; taking into account the pack length.

Gap 103 is determined by the time taken by the collator 50 to accept the last pack of a group, pass it to the inserter head 54 and be free to accept the first pack of the following group, taking into account the pack length.

Using this system has the advantage of maximising cycling speed and minimising track stoppages. It also automatically copes with user adjustments, envelope sizes, document sizes and the quantity of documents, all of which affect the cycle times of different sections of the system.

The invention claimed is:

1. A paper handling apparatus comprising:

a plurality of feeder stations, for feeding documents to a conveyer, a collator for collating documents into packs, and collating packs into groups of documents, and an inserter module for inserting each group into an envelope a monitor which monitors the cycling and working times of sections of the inserter module;

sensors for determining at least one of:

a first desired gap being the minimum gap between trailing edges of consecutive groups;

a second desired gap being the minimum gap between the trailing edge of one pack and the leading edge of the following pack; and a third desired gap being the minimum gap between the trailing edge of one group to the leading edge of the following group; and a controller for controlling at least one of the feeder stations to achieve at least one of the respective desired gaps, wherein the first desired gap is controlled in dependence upon the slowest cycle time of any one of a wetter, the output, an envelope hopper and an insert pawl track, wherein the third desired gap is determined by the time taken by the collator to accept the last pack of a group, pass it to an inserter head and be free to accept the first pack of the following group, taking into account pack length.

2. Apparatus according to claim 1 wherein the second desired gap is controlled in dependence upon the time it takes for the group collator to receive a pack and to become available to receive a further pack of the same group, taking into account the pack length.

3. A method for operating a paper handling apparatus, comprising:

feeding documents to a conveyer;

collating documents into packs;

collating packs into groups of documents;

inserting each group into an envelope;

monitoring cycling and working times of the inserting step;

determining at least one of:

a first desired gap being the minimum gap between trailing edges of consecutive groups;

a second desired gap being the minimum gap between the trailing edge of one pack and the leading edge of the following pack; and a third desired gap being the minimum gap between the trailing edge of one group to the leading edge of the following group; and controlling the feeding step to achieve at least one of the respective desired gaps, wherein the first desired gap is controlled in dependence upon the slowest cycle time of any one of a wetter, the output, an envelope hopper and an insert pawl track, wherein the third desired gap is determined by the time taken by a group collator to accept the last pack of a group, pass it to an inserter head and be free to accept the first pack of the following group, taking into account pack length.

4. A method according to claim 3 wherein the second desired gap is controlled in dependence upon the time it takes for the group collator to receive a pack and to become available to receive a further pack of the same group; taking into account the pack length.

* * * * *